United States Patent [19]

Guenter

[11] 4,322,889
[45] Apr. 6, 1982

[54] TESTING APPARATUS FOR INVOLUTE AND HELICAL GEAR TEETH

[75] Inventor: Erwin Guenter, Widen, Switzerland

[73] Assignee: Maag Gear-Wheel & Machine Co. Ltd., Zürich, Switzerland

[21] Appl. No.: 187,626

[22] Filed: Sep. 15, 1980

[30] Foreign Application Priority Data

Oct. 1, 1979 [CH] Switzerland ............... 8811/79

[51] Int. Cl.³ .................................. G01B 7/28
[52] U.S. Cl. .................................. 33/179.5 R
[58] Field of Search ............... 33/179.5 R, 179.5 D, 33/179.5 E, 174 P

[56] References Cited

U.S. PATENT DOCUMENTS

| | | | |
|---|---|---|---|
| 2,778,119 | 1/1957 | Jumisco | 33/179.5 D |
| 2,895,227 | 7/1959 | Wagner et al. | 33/179.5 R |
| 3,936,946 | 2/1976 | Ruffner et al. | 33/179.5 R |
| 4,182,045 | 1/1980 | Bosch et al. | 33/179.5 R |

FOREIGN PATENT DOCUMENTS 2362173  7/1974  Fed. Rep. of Germany .

OTHER PUBLICATIONS

Article of G. Däsch and W. Krieg, appearing in publication "Feingerätetechnik", 14 Jg, vol. 11, 1965.

Publication Appearing in Textbook Entitled "Kinematik/Getriebelhre", of H. J. Knab.

*Primary Examiner*—Willis Little
*Attorney, Agent, or Firm*—Werner W. Kleeman

[57] ABSTRACT

A testing apparatus for involute and helical gear teeth comprises a rotatable chucking device for the test piece, and a feeler device containing a feeler which can be moved along the tooth flanks of the test piece. A respective drive serves for driving the chucking device and the feeler device. A regulation device is provided for at least one of these drives, and a mechanical transmission arrangement is provided between the chucking device and the feeler device. A displacement pickup or transducer is arranged between two elements of the transmission arrangement and serves to measure the relative movement of both such transmission elements. An electrical circuit serves to infeed the measuring signals of the displacement pickup or transducer to the regulation device and such signals are superimposed upon the measuring signals of the feeler device. The displacement pickup is bridged by an elastically deformable intermediate element which interconnects both of the transmission elements with one another in both of their direction of movements and is sufficiently powerfully or sturdily designed in order to transmit the greatest moment, exerted by the drive of the feeler device at one of the aforementioned transmission elements, to the other transmission element.

5 Claims, 4 Drawing Figures

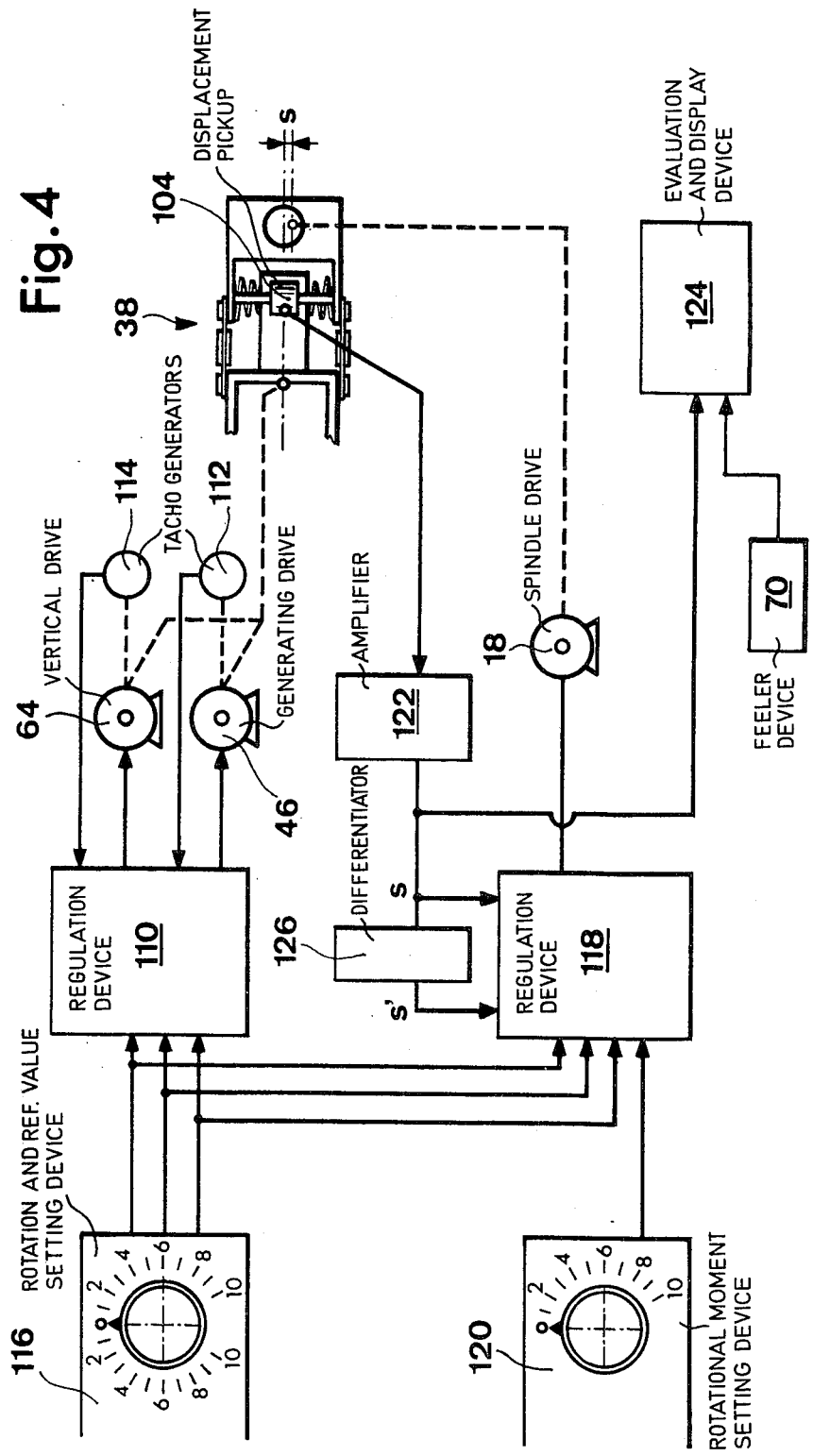

TESTING APPARATUS FOR INVOLUTE AND HELICAL GEAR TEETH

BACKGROUND OF THE INVENTION

The present invention relates to a new and improved construction of testing apparatus for involute and helical gear teeth.

Generally speaking, the involute and helical gear teeth-testing apparatus of the present development is of the type comprising a rotatable chucking device for the test piece, a feeler device containing a feeler which can be moved along the tooth flanks of the test piece, and a respective drive for the chucking device and the feeler device. Also, there is provided a regulation device for at least one of such drives, and a mechanical transmission arrangement is disposed between the chucking device and the feeler device. A displacement path transducer or displacement pickup is arranged between two elements of the transmission, this pickup or transducer measuring the relative movements of both transmission elements. An electrical circuit serves, on the one hand, to infeed the measuring signals of the displacement path transducer to the regulation device and, on the other hand, these measuring signals are superimposed upon the measuring signals of the feeler device.

With a heretofore known testing apparatus of this species, as disclosed in German Patent Publication No. 2,747,863, the mechanical transmission, which interconnects the chucking device with the feeler device, is interrupted at one location, and thus, is divided into two partial chains. One of these partial chains is only connected with the chucking device for the test piece and its drive, whereas the other partial chain only is connected with the feeler device and its drive. The displacement pickup or transducer is arranged between both of the elements of the transmission which neighbor the separation location. Consequently, the entire transmission is load-relieved from the drive of the test piece, and thus, fulfills only a pure measuring function. There thus should be obtained the result that also in the case of large and heavy test pieces there can be extremely accurately measured involute and/or helical tooth errors, in contrast to older prior art testing devices provided for the same purpose where the chucking device for the test piece is connected with the feeler device by means of a totally rigid transmission. With such prior art devices there is provided only a single drive which drives, by means of the transmission, both the chucking device for the test piece and also the feeler device. If such older constructions of testing devices are employed for measuring test pieces having large moment of inertia, then frequently oscillations arise which, for instance, are excited by a stick-slip effect and falsify the measurement results to a point where they no longer can serve any useful purpose.

Up to a certain point such disturbing side effects can be avoided with the described state-of-the-art testing device of the previously mentioned type, but nonetheless with such testing device appreciable oscillations still arise at least at the start of each measuring cycle when the test piece is accelerated to the desired generating velocity. Due to these appreciable oscillations at least part of the measurement results are unusable, since the relative movements of the elements of the transmission arranged at both sides of the displacement path transducer, by virtue of such oscillations, exceed the measurement range of the displacement path transducer, and thus, also the possibility of fault compensation.

SUMMARY OF THE INVENTION

Therefore, with the foregoing in mind it is a primary object of the present invention to provide a new and improved contruction of a testing apparatus for involute and helical gear which is not associated with the aforementioned drawbacks and limitations of the prior art constructions.

Another and more specific object of the present invention aims at providing a new and improved contruction of an involute and helical gear teeth-testing apparatus of the previously mentioned type, wherein there are avoided disturbing oscillations, if not at the start, then at least already during an extremely early phase of each measuring cycle.

Now in order to implement these and still further objects of the invention, which will become more readily apparent as the description proceeds, the invention contemplates that the displacement path transducer is bridged by an elastically deformable intermediate element. Both of the aforementioned transmission elements are connected with one another in their two directions of movement and are structured powerfully enough so that there can be transmitted the greatest moment, exerted by the drive of the feeler device at one of the aforementioned transmission elements, to the other transmission element.

In this way there is avoided the drawback of the described heretofore known species of testing device that, with a sudden acceleration or decleration of one of both partial chains of the transmission, which with the prior art system are separated from one another, the transmission elements arranged to both sides of the separation location arrive at high relative velocity at a stop or impact location and at that location cause a surge which first properly places into operation the oscillations of both partial chains. With the inventive testing device the elastically deformable intermediate element opposes relative movements between both the neighboring transmission elements right from the start with an increasing restoring force. However, the displacement path transducer, owing to the elasticity of the intermediate element and the thus possible relative movements of both neighboring transmission elements, measures the loading of the transmission and delivers measuring signals. These measuring signals are infed, on the one hand, to the regulation device and evaluated in accordance with the known spring characteristic of the entire transmission inclusive of the intermediate element for the drive regulation and, on the other hand, are superimposed upon the measuring signals of the feeler device, in order to correct the measurement result.

In the case of a testing device of the type provided for particularly large test pieces, the drive of the chucking device is designed normally appreciably more powerfully than the drive for the feeler device. Accordingly, the inventive intermediate element is preferably structured to be sufficiently powerful in order to transmit the greatest moment which can be exerted by the drive of the chucking device upon the aforementioned transmission elements.

According to a preferred embodiment of the inventive testing device the intermediate element contains a spring arrangement with which there is connected in parallel a damping arrangement. In other words, there is thus bridged the displacement path transducer both by a spring arrangement as well as by the damping arrangement which is separated therefrom.

In this respect it is advantageous if the spring arrangement contains leaf or blade springs, since such can be clamped, without any particular difficulties, in such a manner that in both directions of a possible relative movement between both of the aforementioned transmission elements they produce exactly reproducible restoring forces.

The damping arrangement preferably contains symmetrically arranged damping elements which only oppose with slight resistance deflections of the intermediate element out of a rest position, however dampen the return back into the rest position.

BRIEF DESCRIPTION OF THE DRAWINGS

FIG. 4 is an electrical circuit diagram of the testing apparatus of the invention.

DETAILED DESCRIPTION OF THE PREFERRED EMBODIMENTS

Figure 1:
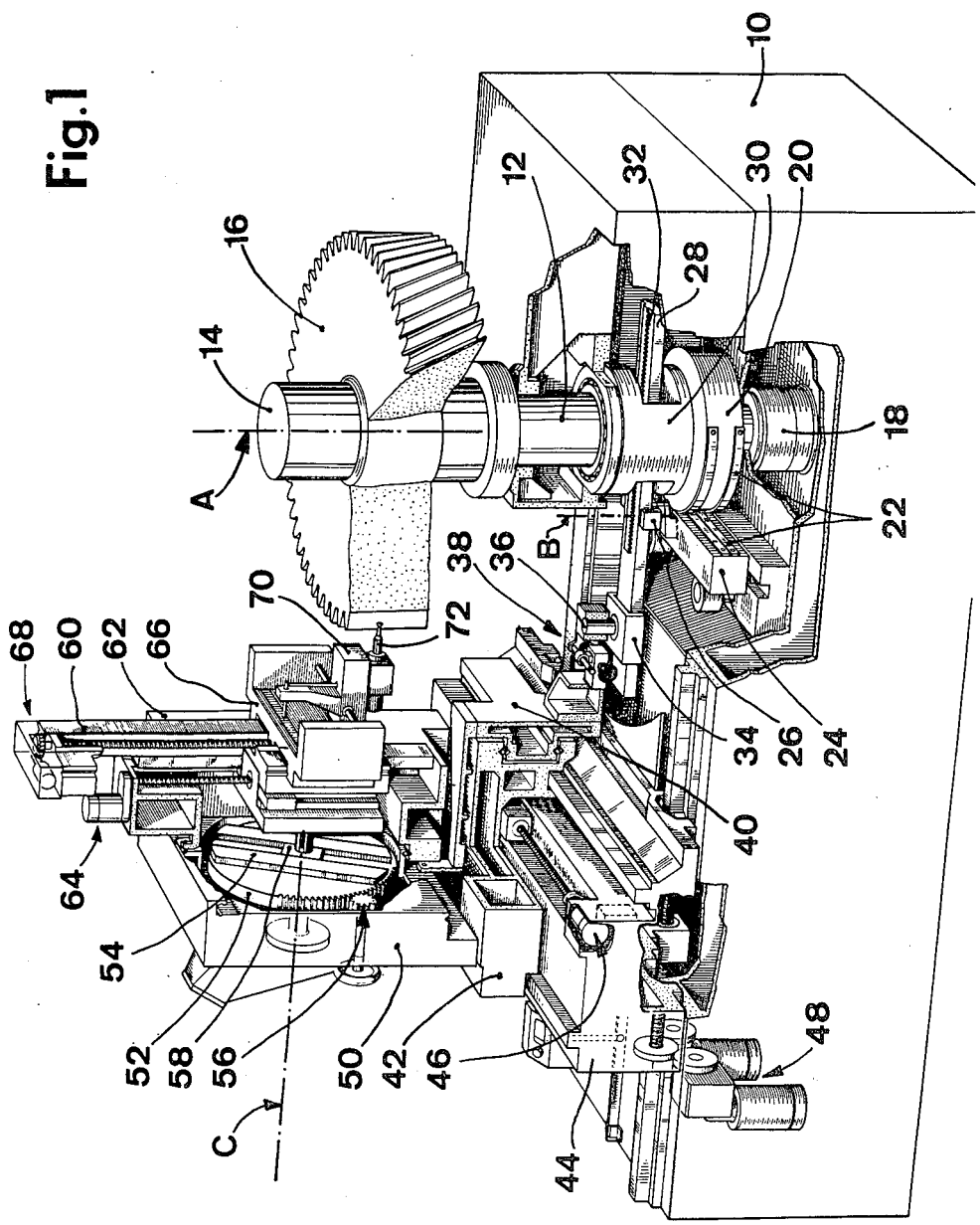
FIG. 1 is a perpective view of a testing apparatus according to the invention partially shown in cutaway.

Describing now the drawings, in the showing of FIG. 1 a work spindle 12 having a vertical geometric axis A is rotatably mounted upon a bed 10. The work spindle 12 possesses a chucking device 14, which has here been shown in simplified fashion as a chucking or clamping mandril, and a test piece, here shown as a gear 16, is connected coaxially and rigidly with the work spindle 12. In the illustrated embodiment, the test piece 16 is shown as a spur gear having inclined or helical configured teeth, which should be checked as to their involute and helix tooth errors.

The work spindle 12 is directly and rigidly coupled with a spindle drive 18 having an electric servo motor. Attached to the work spindle 12 is a generating disc 20 which is connected by roll tapes 22 with a horizontal generating straightedge 24 in a manner such that both can roll upon one another in a slip-free manner. The generating straightedge 24 is guided to be horizontally displaceable at the bed 10 and carries a guide fork 26 which is pivotable in relation to the generating straightedge 24 about a vertical axis B and guides a horizontally dispositioned step-up or transmission lever 28 so as to be lengthwise displaceable.

The step-up or transmission lever 28 extends through an open housing 30 which is attached to the work spindle 12. Within this housing 30 there is mounted to be lengthwise displaceable the step-up or transmission lever 28 and such is also pivotably mounted in the housing 30 for pivotal movement about the axis A. In order to adjust the transmission lever 28 there is secured to its surface a gear rack 32 with which engages a not particularly visible, but conventional pinion which is mounted to be rotatably driven within the housing 30.

Guided upon the transmission lever 28 for lengthwise displacement is a slide shoe 34 at which there is attached a vertical bearing pin 36. The slide shoe 34 is connected with an auxiliary slide or carriage 40 by means of an elastically deformable intermediate element 38 which is pivotably mounted upon the bearing pin 36. Details of the intermediate element 38 will be described more fully hereinafter in conjunction with FIGS. 2 and 3.

The auxiliary slide or carriage 40 is guided to be displaceable at a generating slide or carriage 42 in a direction essentially parallel to the generating straightedge 24. This generating slide or carriage 42 is guided to be displaceable in the same horizontal direction upon a bed slide or carriage 44. The bed slide 44 is guided at right angles to the generating straightedge 24 so as to be displaceable likewise in horizontal direction. In order to displace the generating slide or carriage 42 upon the bed slide 44 there is provided a generating drive 46 containing a servo motor, whereas for displacement of the bed slide carriage 44 upon the bed 10 there is provided a longitudinal drive 48.

Belonging to the auxiliary carriage 40 is a cam housing 50 within which there is rotatably mounted for rotation about a substantially horizontal axis C a substantially circular-shaped cam disc 52. This cam disc 52 is provided with a diametrically arranged cam guide 54 and can be adjusted by means of a gear drive 56 such that the cam guide 54 is inclined with respect to the vertical through an angle which coincides with the tooth helix pitch angle of the test piece 16.

Guided within the cam guide 54 is a cam block 58 which is mounted at a vertical slide or carriage 60. The vertical slide 60 is vertically displaceably guided at a stand or upright 62 belonging to the generating slide 42. In order to displace the vertical slide or carriage 60 there is provided a vertical drive 64 containing a servo motor.

At the vertical slide or carriage 60 there is likewise vertically displaceably guided an adjustment slide or carriage 66 and is adjustably supported in elevation by means of an adjustment drive 68. At the adjustment slide or carriage 66 there is displaceably guided for horizontal movement essentially parallel to the generating straightedge 24 a feeler device 70. This feeler device 70 carries a feeler 72 which selectively scans a tooth flank of the test piece 16 for performing an involute measurement in a plane perpendicular to the axis A or for measuring the tooth helix or tooth inclination in the tooth lengthwise direction, depending upon whether the generating drive 46 or the vertical drive 64 is turned-on.

Figure 2:
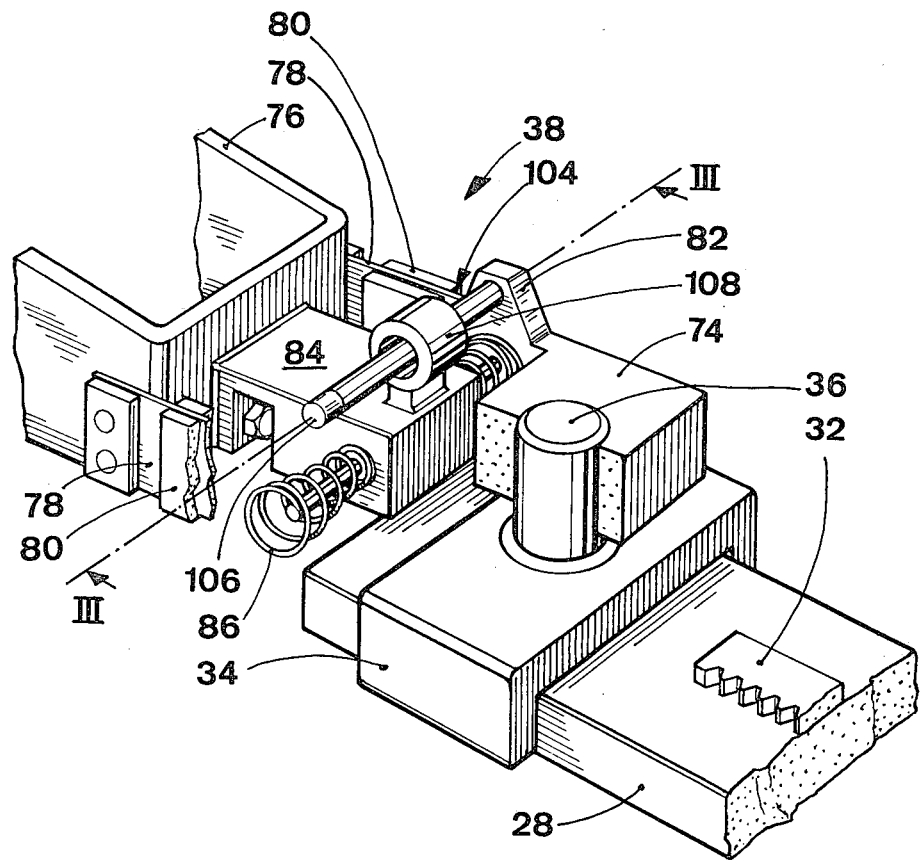
FIG. 2 illustrates a detail, on a considerably enlarged scale, of a portion of the arrangement of FIG. 1 and shown with a somewhat different direction of viewing.
Figure 3:
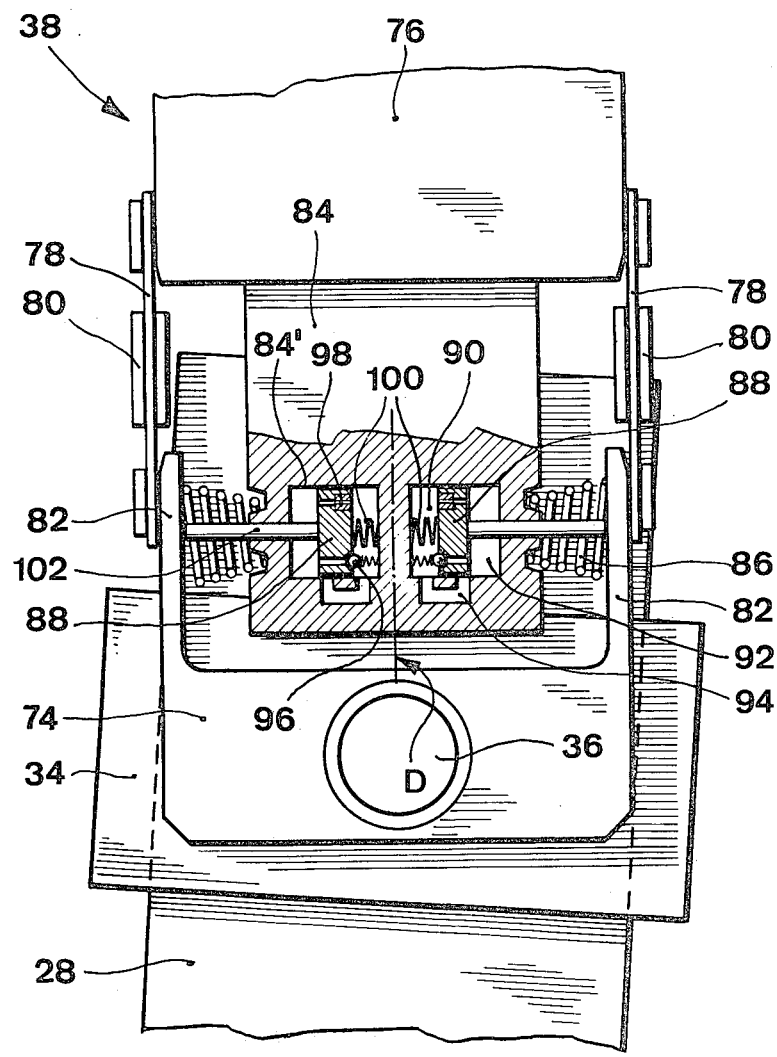
FIG. 3 is a top plan view of the arrangement of FIG. 2, partially shown in sectional view in a horizontal plane, the section being taken substantially along the line III—III thereof.

According to the showing of FIGS. 2 and 3 there belongs to the intermediate element 38 a rigid foot 74 of substantially U-shaped configuration in plan view and which is rotatably mounted on the bearing pin 36 and a likewise rigid head 76 which is attached to the auxiliary slide or carriage 40 and possesses in plan view a substantially T-shaped configuration. The foot 74 and the head 76 are configured symmetrically in relation to a vertical plane. The symmetry plane D of the head 76 extends at right angles to the displacement direction of the auxiliary slide or carriage 40. If the intermediate element 38 is not loaded, then the symmetry plane D of the head 76, as illustrated, coincides with the symmetry plane of the foot 74.

To both sides of the symmetry plane D there is arranged a respective leaf or blade spring 78 which is secured at its one end at the foot 74 and at its other end at the head 76 and is reinforced at its central region by plates 80. The blade or leaf springs 78 are conjointly capable, in each random position of the described drive which interconnects the spindle drive 18 with the generating drive 46 and the vertical drive 64, respectively, of transmitting all forces and moments which are exerted by one of these drives either at the slide shoe 34 or at the auxiliary slide or carriage 40.

The substantially U-shaped foot or foot member 74 has two legs or leg members 82 between which protrudes with play a web 84 of the substantially T-shaped head 76. Between each of both leg members 82 of the web 84 there is arranged with pre-bias a respective conical-shaped helical spring 86. Machined at the web 84 are two cylinders 84' within which a respective piston 88 separates chamber 90, constituting an inner chamber with respect to the symmetry plane D, from an outer chamber 92. Both of these chambers or compartments 90 and 92 are connected with one another to both sides of each piston 88 by a bypass channel 94 when the relevant piston 88 is deflected inwardly out of its rest position shown in FIG. 3. Each of both pistons 88 however blocks the related bypass channel 94 when it assumes it rest position or is shifted outwardly out of such rest position.

Each of both pistons 88 contains a non-return or check valve 96 which only then interconnects both of the chambers and compartments 90 and 92 with one another when the therebetween arranged pistons 88 move outwardly away from the symmetry plane D. Both of the chambers 90 and 92 are however connected, to both sides of each piston 88, by a throttle bore 98 within the related piston, continuously with one another.

Between the web 84 and each of both pistons 88 there is arranged a pre-biased cylindrical helical spring 100 which strives to outwardly press the related piston 88 away from the symmetry plane D. Counteracting the effect of the helical springs 100 are the legs 82 of the foot 74, serving as stop or impact means for a respective piston rod 102.

The spring arrangement formed by the leaf or blade springs 78 and the dampening arrangement formed by the pistons 88 together with the related parts are connected parallel to one another in the direction of flow of the forces between the foot 74 and the head 76. Both bridge a displacement path transducer 104 which is assigned the task of determining the relative movements between the foot 74 and the head 76, and thus, indicating relative movements between the slide shoe 34 and the auxiliary slide or carriage 40, since the movements of the foot 74 differ from those of the slide shoe 34 in any event by negligible small rotations about the bearing pin 36.

Belonging to the displacement path transducer 104 is a rod 106 which interconnects both of the leg members 82, and a movable coil housing 108 attached at the web 84 through which extends the rod 106, this movable coil housing 108 carrying a movable piston which is not particularly visible in the showing of the drawings.

FIG. 4 illustrates the electric circuit where there have been incorporated the spindle drive 18, the generating drive 46, the vertical drive 64, the feeler device 70 and the displacement path transducer 104. Belonging to the circuit is a first regulation device 110, which depending upon the nature of the desired measurement either regulates the generating drive 46 or the vertical drive 64 and evaluates signals which are delivered by a tachogenerator 112 and 114, respectively. The direction of rotation of the generating drive 46 and the vertical drive 64 as well as reference values of the measuring velocity can be set or adjusted at a first adjustment device 116. Operatively associated with the spindle drive 18 is a second regulation device 118. A base rotational moment of the spindle drive 18 can be adjusted at a second adjustment device 120 which is connected with the regulation device 118. The measuring signals of the displacement path transducer 104 are infed, on the one hand, by means of an amplifier 122 to an evaluation and display device 124 and at that location are superimposed upon the signals delivered by the feeler 70. On the other hand, the measuring signals of the displacement path transducer 104, which are amplified by the amplifier 122, and which signals are dependent upon the displacement path s are directly infed to the second regulation device 118 and additionally infed by means of a differentiator 126, as velocity-dependant signals s', to the second regulation device 118, so that the latter, during the regulation of the spindle drive 18, also can take into the account the velocity with which the parts of the intermediate element 38 which move towards one another are shifted.

While there are shown and described present preferred embodiments of the invention, it is to be distinctly understood that the invention is not limited thereto, but may be otherwise variously embodied and practiced within the scope of the following claims. Accordingly,

What I claim is:

1. A testing apparatus for involute and helical gear teeth comprising:
    a rotatable chucking device for a test piece which is to be tested;
    a feeler device containing a feeler which can be moved along two flanks of the test piece;
    a respective drive means for each said chucking device and said feeler device;
    a regulation device for at least one of said drive means;
    a mechanical transmission means arranged between said chucking device and said feeler device;
    said mechanical transmission means containing transmission elements;
    a displacement path transducer arranged between two transmission elements of said transmission means for measuring the relative movement of both of said transmission elements;
    an electric circuit for infeeding measuring signals of the displacement path transducer to the regulation device and for superimposing such measuring signals of the displacement path transducer upon measuring signals of the feeler device;
    an elastically deformable intermediate element for bridging the displacement path transducer; and
    said elastically deformable intermediate element interconnecting both said transmission elements in both of their directions of movement with one another and being structured powerfully enough in order to transmit the greatest moment which can be exerted by said drive means of said feeler device at one of said transmission elements, to the other transmission element.

2. The testing apparatus as defined in claim 1, wherein:
    said intermediate element is also structured powerfully enough in order to transmit the greatest moment which can be exerted by the drive means of the chucking device to said transmission elements.

3. The testing apparatus as defined in claim 1, wherein:

said intermediate element comprises a spring arrangement containing a parallelly connected damping arrangement.

4. The testing apparatus as defined in claim 3, wherein:

said spring arrangement contains leaf springs.

5. The testing apparatus as defined in claim 3, wherein:

said damping arrangement contains symmetrically arranged damping elements;

said damping elements opposing with only a slight resistance deflections of the intermediate element out of a rest position yet dampening the return of such intermediate element back into its rest position.

* * * * *